(12) United States Patent
Langkjaer

(10) Patent No.: US 6,412,825 B1
(45) Date of Patent: Jul. 2, 2002

(54) ASSEMBLY OF AN END-FITTING AND A FLEXIBLE PIPE

(75) Inventor: Krystyna Izabella Langkjaer, Naerum (DK)

(73) Assignee: NKT Flexibles I/S, Brondby (DK)

( * ) Notice: Subject to any disclaimer, the term of this patent is extended or adjusted under 35 U.S.C. 154(b) by 0 days.

(21) Appl. No.: 09/529,521

(22) PCT Filed: Oct. 14, 1997

(86) PCT No.: PCT/DK97/00451
§ 371 (c)(1), (2), (4) Date: Jun. 30, 2000

(87) PCT Pub. No.: WO99/19655
PCT Pub. Date: Apr. 22, 1999

(51) Int. Cl.[7] .................................................. F16L 31/00
(52) U.S. Cl. .................. 285/222.2; 29/527.3; 29/527.4; 285/242; 285/254; 285/222.1; 285/222.3; 285/222.4
(58) Field of Search .......................... 285/222.1–222.5, 285/242, 255, 243, 254; 29/527.3, 527.4

(56) References Cited

U.S. PATENT DOCUMENTS

| 959,187 | A | | 5/1910 | Witzenmann | |
|---|---|---|---|---|---|
| 3,462,177 | A | * | 8/1969 | Skinner et al. | 285/222.2 |
| 4,234,019 | A | * | 11/1980 | Hornor et al. | 285/222.2 |
| 4,875,717 | A | * | 10/1989 | Policelli | 285/222.1 |
| 4,950,001 | A | * | 8/1990 | Briggs | 285/222.1 |
| 6,273,142 | B1 | * | 8/2001 | Braad | 285/222.1 |

FOREIGN PATENT DOCUMENTS

| DE | 1032987 | 6/1958 |
|---|---|---|
| DE | 2357047 | 5/1974 |
| DE | 2366584 | 5/1974 |
| FR | 863 470 | 4/1941 |
| FR | 1 094 387 | 5/1955 |
| FR | 67 525 | 3/1958 |

* cited by examiner

*Primary Examiner*—Lynne H. Browne
*Assistant Examiner*—Aaron Dunwoody
(74) *Attorney, Agent, or Firm*—McCormick, Paulding & Huber LLP

(57) ABSTRACT

An assembly of an end-fitting and a flexible pressure pipe which is of a non-bonded structure and comprises a number of layers including at least one layer (5) having a number of helically wound flat metallic tensile armour wires with end parts which, in the assembled condition, are embedded in an anchor consisting of a casting material such as epoxy which is injected into a cavity formed in the end-fitting. The flat wire end parts have at least one twist turning generally around the centerline of the wire. Said twists lock the tensile armor wires firmly in the anchor and therefore provide a greater resistance to axial tensile loads acting on the assembly than has been known before. Furthermore the joint is a simple and cheap structure and can be made in situ.

14 Claims, 5 Drawing Sheets

ASSEMBLY OF AN END-FITTING AND A FLEXIBLE PIPE

BACKGROUND ART

The invention concerns an assembly of an end-fitting and a flexible pressure pipe which is of a non-bonded structure comprising a number of layers including at least one layer having a number of helically wound flat metallic tensile armour wires with end parts which, in the assembled condition, are embedded in an anchor consisting of a casting material, e.g. a polymer such as epoxy, which is injected into a cavity formed in the end-fitting.

Flexible pressure pipes are used in a variety of applications, including water supply lines, sewage lines and lines for transporting chemicals such as liquid ammonia and phosphoric acid and also high pressure offshore flexible pipes for the oil and gas industry.

The tensile armour layer of the flexible pressure pipe and the joint between this layer and the end-fitting provides the majority of the resistance to axial tensile loads acting on the assembly of the end-fitting and the pipe. Such loads can for many applications be very high.

In a conventional end-fitting, the joint between the tensile armour layer and the end-fitting is obtained by providing the end part of each flat tensile armour wire with a bent hook-like portion prior to embedding the end part in the casting material.

Such an end-fitting and a pressure pipe having wire parts for anchoring the wires in the casting material are known from DE 1 032 987. These known wire parts are bent 180°.

The resisting moment of each flat wire is, however, relatively small and, moreover, as there is no or only a little friction between the casting material and the wires these will tend to be drawn out of the casting material while straightening out the bend when acted upon by an axial tensile load which is smaller than the tensile armour layer itself is able to withstand. In those situations in which the flexible pipes are to be used for high pressures and/or are descending over a great length it may be difficult to provide the assembly with sufficient strength to withstand the great axial tensile loads acting thereon.

To overcome the above mentioned problems, in some previous embodiments the ends of the tensile armour wires have been welded to a part of the end-fitting. In this way the strength of the joint between the layer and the end-fitting has been increased, but at the expense of a rather high production cost because welding is a very time-consuming process which must be carried out over a long period of time to ensure that the polymer layers are not harmed by heat from the welding.

SUMMARY OF THE INVENTION

The object of the invention is to provide an assembly of the type mentioned in the opening paragraph in which the joint between the layer of helically wound flat metallic tensile armour wires and the end-fitting is a simple and cheap structure which provides a greater resistance to axial tensile loads acting on the assembly than has been known before.

This is achieved in that at least some of the flat wire end parts have at least one twist, turning generally around the centreline of the wire. This twist will lock the end part of the wire firmly in the casting material because the twist must be straightened out before the end part can be drawn out of the casting material. To straighten out the twist, when the wire is acted upon by a large tensile force, the twist must be acted upon by a sufficiently high reactive torque from the casting material and such high torque is difficult or nearly impossible to provide because the torque acts with a very short moment arm upon the twist.

The joint between the end parts of the tensile armour wires and the end-fitting can be provided with a superior strength when each of the end parts have at least two successive twists turning in opposite directions to each other, such that the joint between the end part and the casting material is secured against loosening by preventing a screwing movement of the twists.

An optimal joint is furthermore achieved when each twist extends over a length of between one and three times the width of the cross-section of the flat wire, because the material of the flat wire is not then overloaded when being twisted and the flat surface of the wire in the twist is at the same time turned sufficiently sharply across the axis of the wire so as to be firmly anchored in the casting material.

To counteract straightening of the twists which would be sufficient to allow them to be drawn out of the casting material, it is advantageous if the twists are turned more than 20° and especially about 90°.

As mentioned above, each twist is acted upon by a high reactive torque from the casting material when the wire is under a heavy tensile load. As the moment arm of the torque is short, the torque itself will consequently generate high compressive loads upon the casting material tending to crush it. To avoid a dangerous concentration of compressive loads on the casting material, two successive twists on the same wire can advantageously be separated by a substantially straight length of wire.

A flexible pressure pipe typically has two counter wound layers of helically wound flat metallic tensile armour wires. In this case a concentration of compressive loads on the casting material can be avoided when the wire end parts of one of said layers form a different angle with the axis of the end-fitting to the wire end parts of the other layer.

A compact construction with a small diameter is obtained when the centreline of the flat wire end parts extends along a generally straight line.

The invention also concerns a method for assembling an end-fitting and a flexible pressure pipe of the above named type and which comprises removing the layers surrounding the wires at the end of the pipe, forming at least one twist in at least some of the flat wire end parts by turning the wires generally around their centrelines, placing the end parts into a cavity formed in the end-fitting, and injecting a casting material, e.g. a polymer such as an epoxy, in said cavity. This method can be carried out in situ.

Two successive twists can advantageously be formed at the same time on a wire end part by engaging the end part with two jaws of a first tool part, engaging the end part with a jaw of a second tool part between said two jaws of the first tool part and turning the two tool parts in relation to each other generally around the centreline of the wire.

BRIEF DESCRIPTION OF THE DRAWINGS

The invention will be explained more fully by the following description, given by way of example, with reference to the drawings, in which.

DETAILED DESCRIPTION OF PREFERRED EMBODIMENTS

Figure 1:
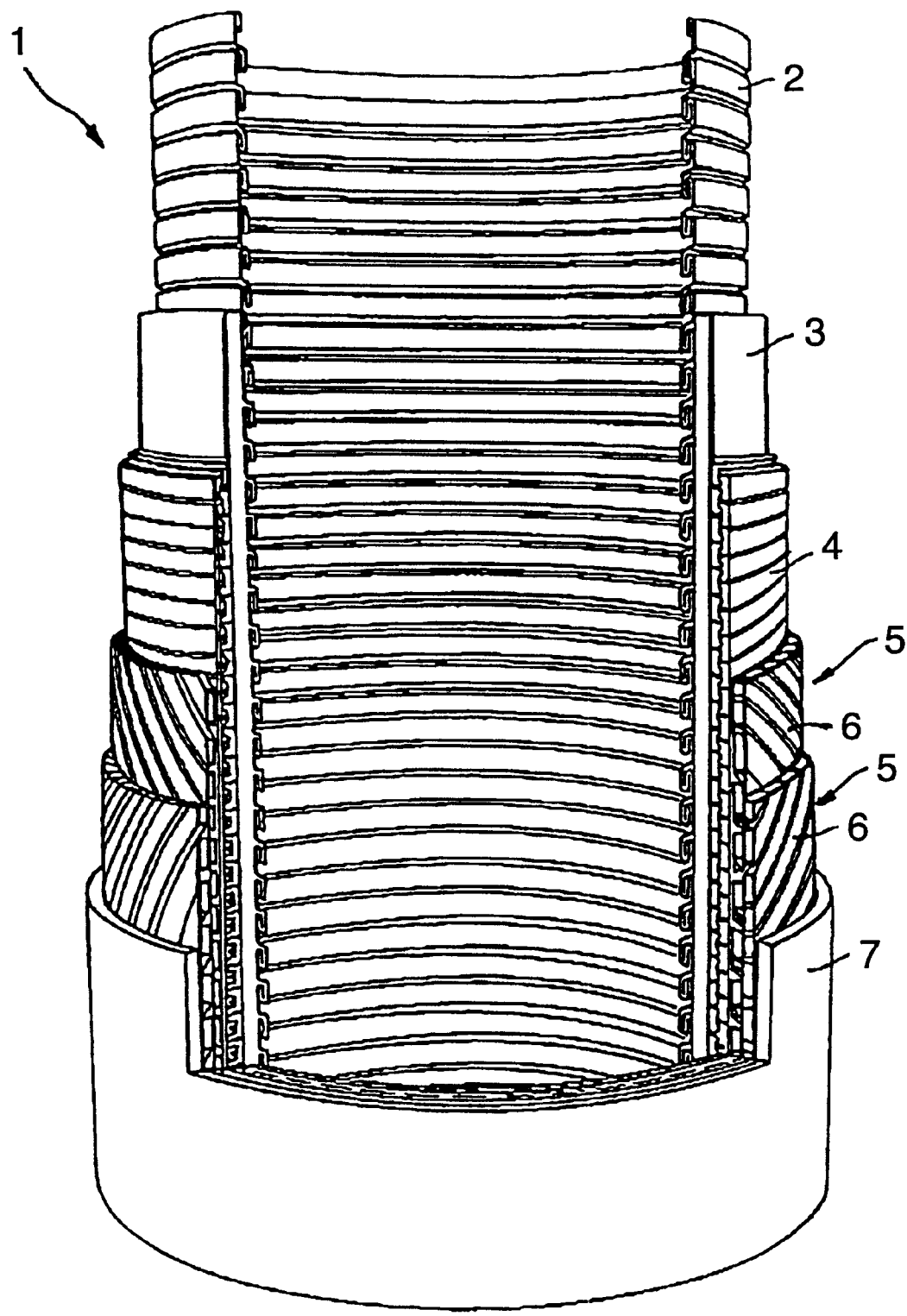
FIG. 1 shows, partly in axial section, a typical flexible pressure pipe.

FIG. 1 shows a flexible pressure pipe, which is generally designated by 1. The pipe is of a non-bonded structure comprising a number of layers which in this embodiment are:

- a carcass 2 of an interlocking structure made from metallic strips. The carcass serves, in the main, to prevent collapse of the pipe due to pipe decompression, external pressure, tensile armour pressure and mechanical crushing loads,
- an inner lining 3 in the form of an extruded polymer layer for providing internal fluid integrity,
- a pressure armour 4 in the form of structural layers consisting of helically wound C-shaped metallic strips with a high lay angle,
- tensile armour 5 consisting of a pair of helically counter wound flat metallic tensile wires 6 with a lay angle typically between 20° and 60°. The tensile armour serves for providing resistance to axial tensile loads, and
- an outer sheath 7 in the form of an extruded polymer for shielding the structural elements of the pipe from the outer environment and providing mechanical protection.

Figure 2:
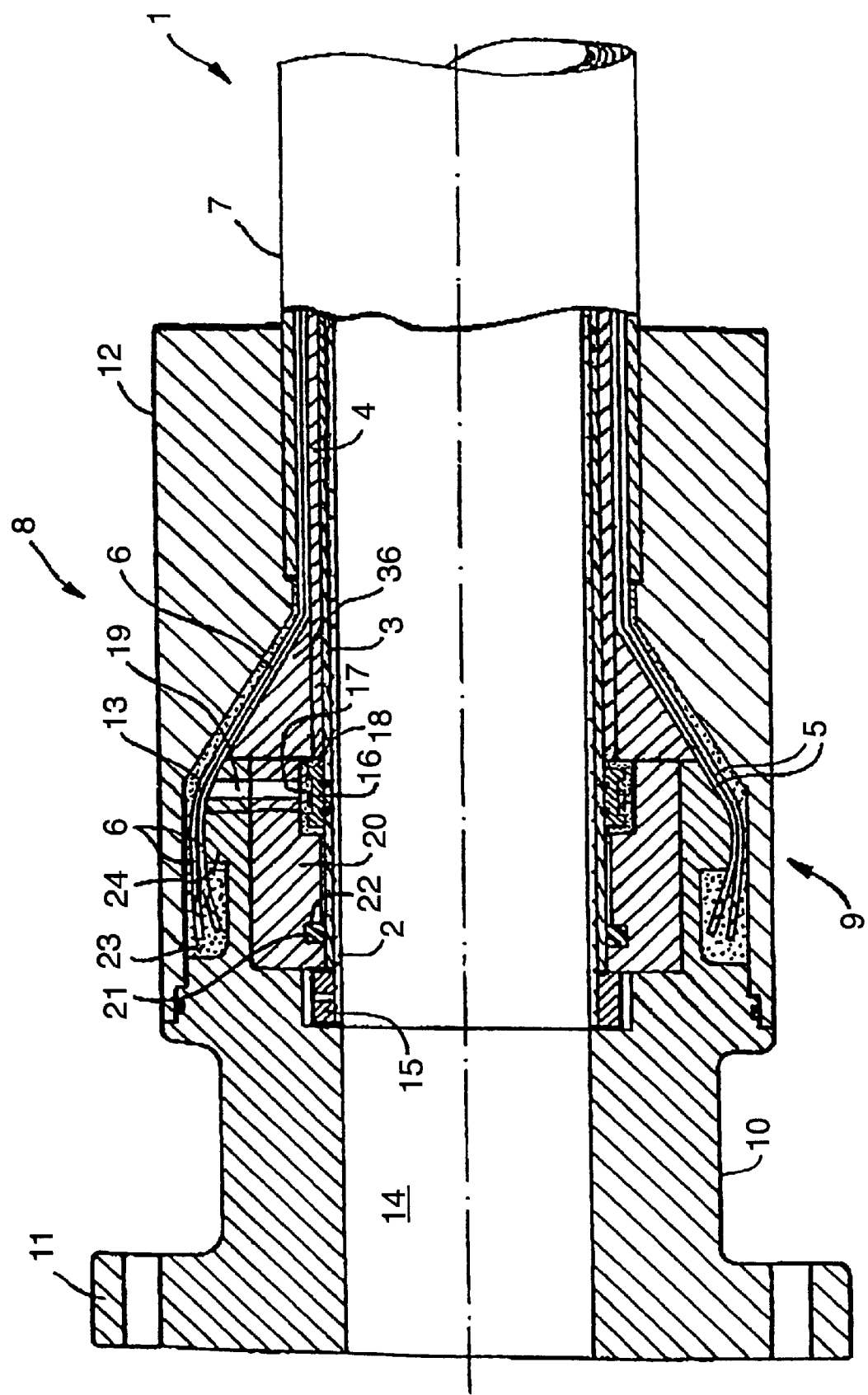
FIG. 2 shows, partly in axial section, an assembly of an end-fitting and the flexible pressure pipe shown in FIG. 1.

FIG. 2 shows an assembly 8 of an end-fitting 9 and the flexible pressure pipe 1. The end-fitting 9 forms the transition between the pipe and a connector and for this purpose has a first part 10 with a connection flange 11, a second part 12, and a third part 36. The three parts 10; 12; 36 delimit a cavity 13 which partly is substantially cone-shaped.

The end-fitting 9 has a through opening 14 for accommodating an end of the pipe 1. When said end has been led into the through opening 14 the carcass 2 is fastened to the end fitting 9 by means of a lock nut 15 and to the inner lining 3 by means of a lock ring 16 fitted into an annular groove 17 in the wall of the through opening 14. The lock ring 16 is secured in the groove 17 by a casting material 18, e.g. epoxy, which is injected through a hole 19.

A ring 20 provides a stop for the lock nut 15. In the embodiment shown a sealing ring 21 for tightening the end-fitting 9 and the inner lining 3 is fitted into a groove 22 in the ring 20.

When the pipe 1 is to be assembled with the end-fitting 9 the tensile armour 5 is exposed by initially removing the outer sheath 7 along a length at the end of the pipe. Then the flat metallic wires 6 of the tensile armour 5 are led into the cavity 13 in the end-fitting 9 while the other layers 2,3,4,7 are led into the through opening 14. Finally a casting material, e.g. epoxy, is injected into the cavity making an anchoring 23 for the wires 6.

When exerting a tensile force on the assembly of the end-fitting 9 and the pipe 1, most of this force is transmitted from the wires 6 of the pipe 1 to the end-fitting 9 via the anchor 23. This anchor is, in this case, retained by a stop face 24 in the end-fitting and by the fact that the cone-shaped part of the anchor 23 converges in the direction of the tensile force such that the anchor cannot been drawn out of the cavity 13. Nevertheless, the wires 6 could still be drawn out of the anchor 23, when acted on by large tensile forces, because there is no or only a little friction between the casting material and the wires.

Figure 3:
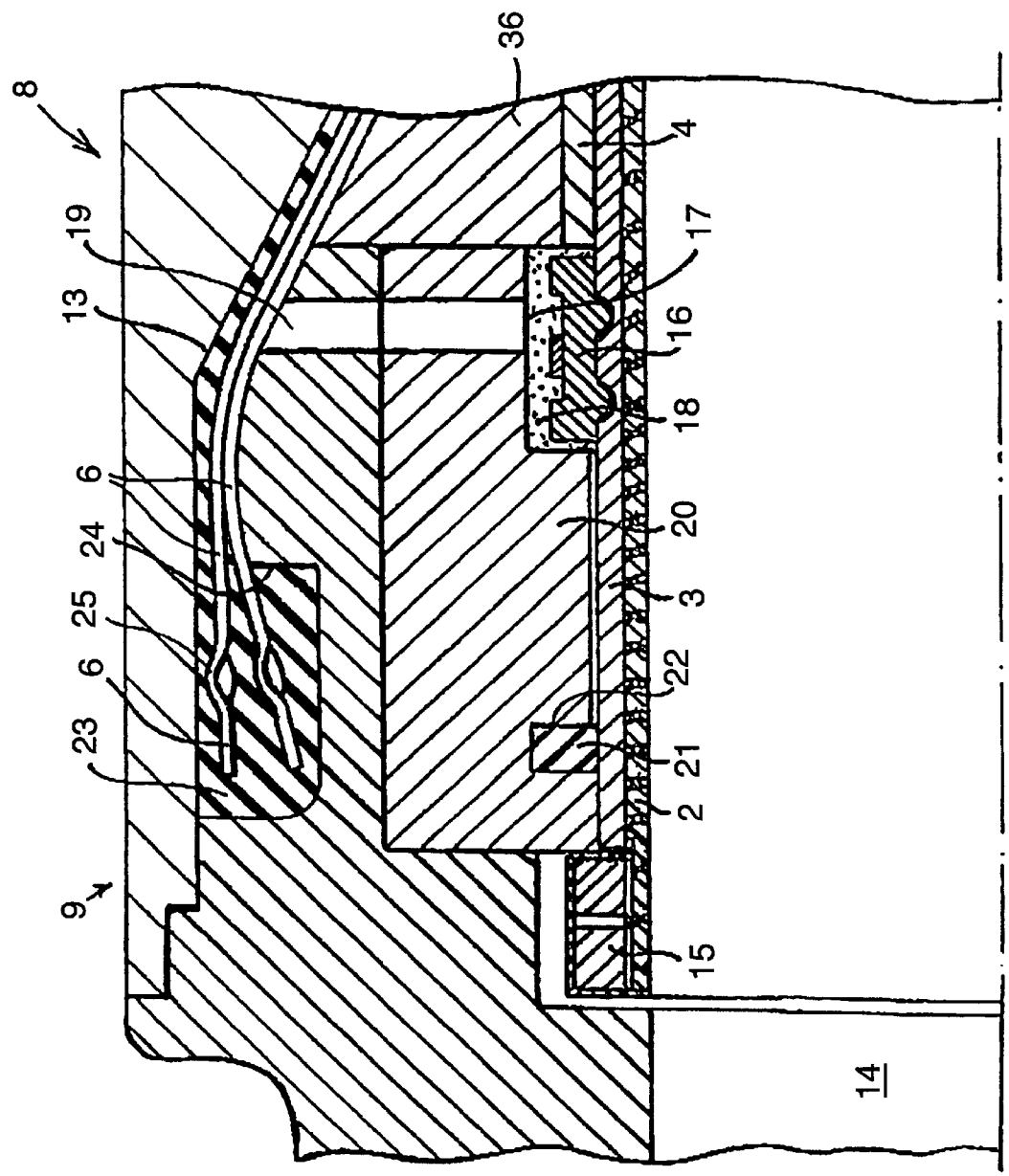
FIG. 3 shows on an enlarged scale a part of the assembly shown in FIG. 2.
Figure 4:
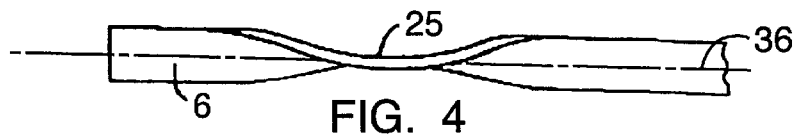
FIG. 4 is a lateral view of a twist on a flat metallic tensile armour wire of the flexible pressure pipe shown in FIG. 1.

As best seen in FIG. 3 and FIG. 4, in accordance with the invention, there is therefore a twist 25 formed in the end of each of the flat wires 6 around a centreline 36. To straighten out such a twist 25 would require a high reactive torque from the anchor. Such a high torque is, however, difficult or impossible to obtain as the torque only can act with a very short moment arm upon the twist. Consequently, the twists will lock the wires firmly to the anchor.

Figure 5:
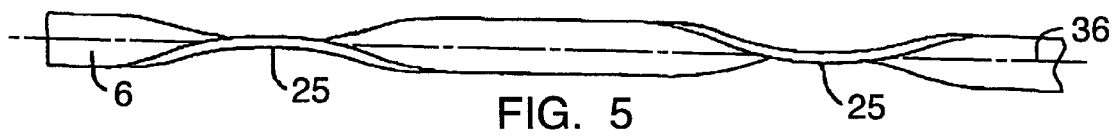
FIG. 5 is a lateral view of a flat metallic tensile armour wire having two twists turning in opposite directions to each other.

FIG. 5 shows another embodiment in which each flat wire has two twists turning in opposite directions to each other such that the flat wires advantageously cannot be screwed out of the anchor.

Figure 6:
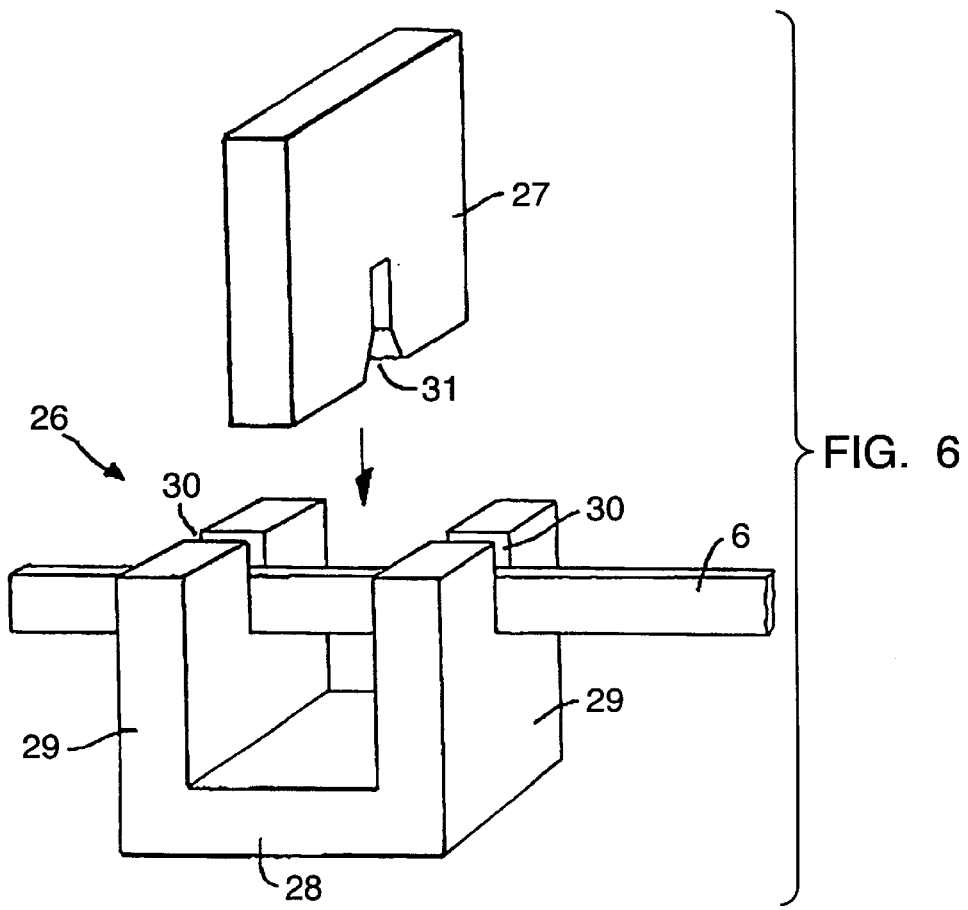
FIG. 6 shows a tool for forming two twists at the same time on a flat metallic tensile armour wire.

FIG. 6 shows a tool for forming two successive twists at the same time. The tool, which is generally designated by 26, consists of a plate-shaped first tool part 27 and an U-shaped second tool part 28 having in this example two upright arms 29 arranged at a distance from each other. In each arm 29 there is a slit 30 and in the first tool 27 there is another slit 31.

In the figure, an end part of a flat wire 6 has been inserted into the two slits 30 of the second tool part 27. The first tool part is then moved in the direction of the arrow such that the slit 31 of this tool part 27 engages the wire end part between the two arms 29 of the second tool part 29.

Finally, by turning the two tool parts about 90° in relation to each other around the centreline of the wire the two successive twists are formed. This operation can be easily and quickly performed in situ. The two twists, seen in FIG. 5, are separated by a straight length of wire to avoid crushing of the material of the anchor due to a dangerous concentration of compressive loads.

Also to avoid such a dangerous concentration of compressive loads, the wire end parts of one of the two helically counter wound layers of flat metallic wires form a different angle with the axis of the end-fitting to the wire end parts of the other of the two layers, as seen in FIGS. 2 and 3.

Moreover, the wires of both layers extend along a generally straight line to reduce the diameter of the assembly. Also, the length of the end-fitting can advantageously be reduced when using the twists according to the invention instead of securing the wire end parts in the anchor by means of conventional methods.

EXAMPLE

A tensile test on an assembly according to the invention was carried out on an section of an ID 6 inch flexible pressure pipe with end-fittings mounted in both ends. The total length was approximately 7 m.

The end parts of the flat metallic tensile armour wires were embedded in an anchor consisting of epoxy injected into a cavity of the end-fitting.

Figure 7:
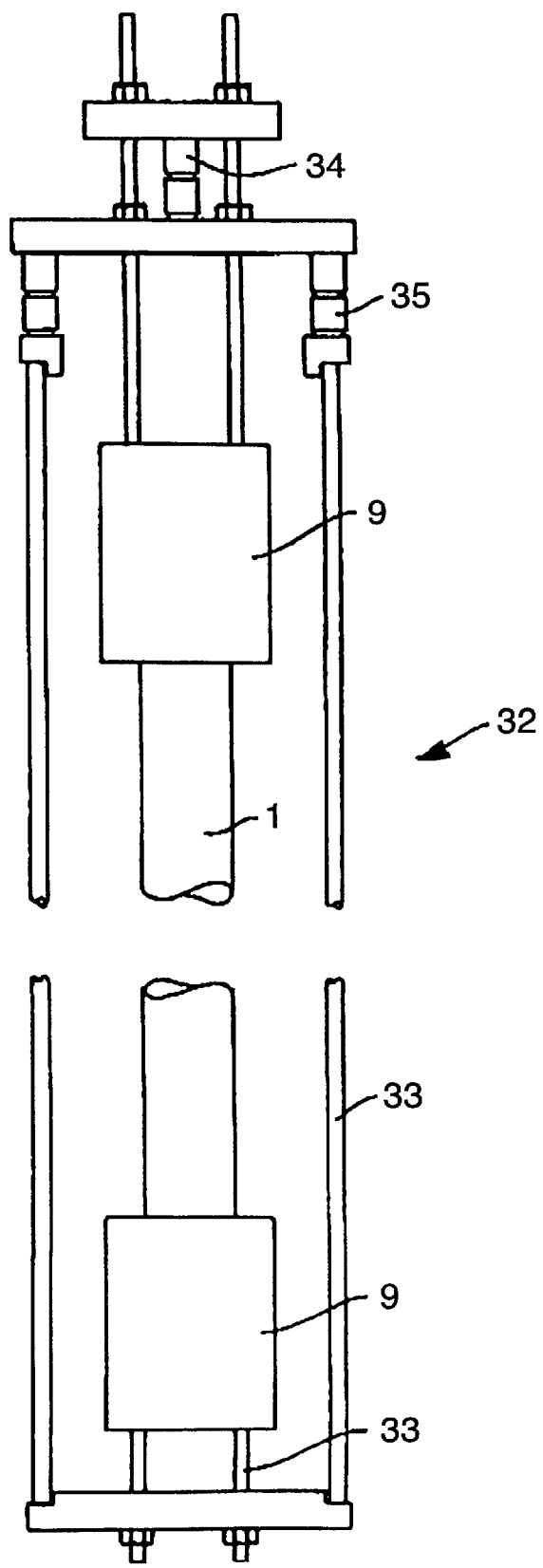
FIG. 7 shows, schematically, a test rig for tensile testing of an assembly according to the invention.

The test pipe was mounted in a test rig 32 in which the pipe was subjected to tensile loading by eight tensile rods 33, as shown in FIG. 7. The tensile force was established by means of two systems of pressure cylinders. In the first system 34, two cylinders were mounted on top of each other providing a total tensile force of 1227 kN and 60 mm extension. In the second system 35, four groups of two cylinders were mounted on top of each other, providing a total tensile force of 4908 kN and 60 mm extension. The applied tensile load was measured by measuring the hydraulic pressure in the second system. This gives the advantage of a measured hydraulic pressure of 1 bar giving rise to a total force of 4.908 kN, no matter which of the two systems is used.

Four strain gauges (not shown) were mounted on four different armour wires in the middle of the pipe section. The strain gauges were mounted in the following positions: 0°, 90°, 180°, and 270°.

Two strain gauges (not shown) were mounted on one of the end-fittings. One strain gauge was mounted parallel to the pipe axis, and the other was mounted perpendicular to the pipe axis.

All signals from the transducers were fed into a datalogger. The elongation of the pipe was measured manually.

Initially, the second system was extended 5–10 mm to allow the hydraulic pressure to be measured.

The test pipe was subjected to axial tensile load by slowly increasing the hydraulic pressure in the first system, until this system was extended 60 mm. Then the bolts were retightened to lock the test pipe in the present position, before the cylinder was brought back to zero. This cycle was then repeated in order to elongate the test pipe above the direct limit of the hydraulic system. Finally, the second system was brought into action to give the pipe the final elongation, despite the fact that the first system had sufficient load capacity.

When the hydraulic system was loaded to approximately 150–160 bar, the first armour wire appeared to fail in the pipe. Trying to increase the load further resulted in other wires failing in the pipe without a significant increase in load. The maximum applied load was 171 bar, corresponding to 839 kN in axial tensile load on the pipe. After having reached the maximum load, it became increasingly difficult to maintain the pressure as the pipe elongated at decreasing tensile load.

The results from the strain gauges mounted on the end-fitting showed significantly lower stresses as expected. After terminating the test, the joint between the end parts of the armour wires and the end-fitting was examined and it appeared that the joint was undamaged.

Accordingly, it can be concluded that the assembly of an end-fitting and a flexible pressure pipe according to the invention provides a greater resistance to axial tensile loads acting on the assembly than does the pipe itself.

Having thus provided a general discussion, and specific illustrations by way of examples, it is to be understood that no undue restrictions are to be imposed by reason thereof. Many other embodiments are imaginable within the scope of the invention. The specific joint, according to the invention, between the end parts of the tensile armour wires 6 and the end-fitting 9 can also be used in combination with other constructions of the joint between the end-fitting 9 and the carcass 2 and the inner lining 3, respectively, in addition to those described above and shown in the figures.

What is claimed is:

1. An assembly of an end-fitting and a flexible pressure pipe which is of a non-bonded structure comprising a number of layers including at least one layer having a number of helically wound flat metallic tensile armour wires with end parts which, in the assembled condition, are embedded in an anchor consisting of a casting material which is injected into a cavity formed in the end-fitting, characterized in that at least some of the flat wire end parts have at least one twist turning generally around the centre-line of the wire.

2. An assembly according to claim 1, wherein at least some of the flat wire end parts have at least two successive twists turning in opposite directions to each other.

3. An assembly according to claim 1 wherein each twist extends over a length of between 1 and 3 times the width of the flat wire.

4. An assembly according to claim 1, wherein each twist turns at least 20°.

5. An assembly according to claim 1 wherein each twist turns about 90°.

6. An assembly according to claim 1 wherein two successive twists are separated by a substantially straight length of wire.

7. An assembly according to claim 1 wherein the centre-line of at least some of the flat wire end parts extends along a substantially straight line.

8. An assembly according to claim 1, wherein the flexible pressure pipe has two counter wound layers of helically wound flat metallic tensile armour wires, characterized in that the wire end parts of one of said layers form a different angle with the axis of the end-fitting to the wire end parts of the other layer.

9. A method for assembling an end-fitting and a flexible pressure pipe which is of a non-bonded structure comprising a number of layers including at least one layer having a number of helically wound flat metallic tensile armour wires, characterized in that the method comprises, removing the layers surrounding the wires at the end of the pipe, forming at least one twist in at least some of the flat wire end parts by turning the wires generally around their centre, placing the end parts into a cavity formed in the end-fitting, and injecting a casting material into said cavity.

10. A method for assembling an end-fitting and a flexible pressure pipe which is of a non-bonded structure comprising a number of layers including at least one layer having a number of helically wound flat metallic tensile armour wires, characterized in that the method comprises, removing the layers surrounding the wires at the end of the pipe, forming at least one twist in at least some of the flat wire end parts by turning the wires generally around their centre, placing the end parts into a cavity formed in the end-fitting, and injecting a casting material into said cavity, wherein two successive twists are formed at the same time by engaging the end part with two jaws of a first tool part, engaging the end part with a jaw of a second tool part between said two jaws of the first tool part and turning the two tool parts in relation to each other generally around the centre of the wire.

11. An assembly according to claim 1 wherein the casting material comprises a polymer.

12. An assembly according to claim 11 wherein the polymer comprises an epoxy.

13. A method according to claim 9 wherein in the step of injecting a casting material into said cavity, the casting material comprises a polymer.

14. A method according to claim 13 wherein in the step of injecting a casting material into said cavity, the casting material comprises an epoxy.

* * * * *